(12) United States Patent
Yoshida et al.

(10) Patent No.: US 9,488,269 B2
(45) Date of Patent: Nov. 8, 2016

(54) HYDRAULIC CONTROL DEVICE FOR AUTOMATIC TRANSMISSION

(71) Applicant: HONDA MOTOR CO., LTD., Tokyo (JP)

(72) Inventors: Shunsuke Yoshida, Wako (JP); Tetsuya Mochizuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 14/601,231

(22) Filed: Jan. 21, 2015

(65) Prior Publication Data
US 2015/0233471 A1   Aug. 20, 2015

(30) Foreign Application Priority Data

Feb. 18, 2014   (JP) .................................. 2014-028910

(51) Int. Cl.
| | |
|---|---|
| *F16H 61/00* | (2006.01) |
| *F16H 61/12* | (2010.01) |
| *F16H 61/02* | (2006.01) |
| F16H 61/686 | (2006.01) |
| F16H 63/30 | (2006.01) |
| F16H 59/68 | (2006.01) |

(52) U.S. Cl.
CPC .......... *F16H 61/12* (2013.01); *F16H 61/0206* (2013.01); *F16H 61/686* (2013.01); *F16H 63/3026* (2013.01); *F16H 2059/683* (2013.01); *F16H 2061/1264* (2013.01); *F16H 2200/0069* (2013.01); *F16H 2200/2012* (2013.01); *F16H 2200/2046* (2013.01); *F16H 2200/2082* (2013.01)

(58) Field of Classification Search
CPC ...................................................... F16H 61/12
See application file for complete search history.

(56) References Cited

U.S. PATENT DOCUMENTS

| | | | | |
|---|---|---|---|---|
| 4,903,551 A | * | 2/1990 | Hiramatsu | .......... F16H 61/0206 477/131 |
| 2007/0099739 A1 | * | 5/2007 | Foster | .................... B60K 6/445 475/120 |

(Continued)

FOREIGN PATENT DOCUMENTS

| | | |
|---|---|---|
| JP | 2001-248723 | 9/2001 |
| JP | 2005-133856 | 5/2005 |
| JP | 5123130 B2 | 4/2010 |

OTHER PUBLICATIONS

Machine translation of JP2001248723 dated Jun. 26, 2016.*

(Continued)

*Primary Examiner* — Tisha Lewis
(74) *Attorney, Agent, or Firm* — Mori & Ward, LLP

(57) ABSTRACT

A hydraulic control device for an automatic transmission includes a cut-off valve and a line pressure detector. The cut-off valve has a valve element located at one of a first position and a second position. The first position disables supply of a hydraulic fluid to a frictional engagement mechanism of the automatic transmission. The second position enables supply of the hydraulic fluid to the frictional engagement mechanism. The line pressure detector is configured to detect a line pressure. The cut-off valve is to control a hydraulic fluid passage so that the line pressure is supplied to the line pressure detector in a case where the valve element is at the first position and so that the line pressure is not supplied to the line pressure detector in a case where the valve element is at the second position.

12 Claims, 6 Drawing Sheets

(56) References Cited

U.S. PATENT DOCUMENTS

2009/0093338 A1* 4/2009 Takahashi ............ F15B 13/0402
477/51
2013/0233415 A1* 9/2013 Yajima ................ F16H 61/0251
137/551

OTHER PUBLICATIONS

Japanese Office Action for corresponding JP Application No. 2014-028910, Jan. 22, 2016 (w/ machine translation).

* cited by examiner

FIG. 2A

|  | C1 | C2 | C3 | B1 | B2 | B3 | F1 | GEAR RATIO |
|---|---|---|---|---|---|---|---|---|
| RVS |  |  | ○ |  | ○ |  | ○ | 4.008 |
| 1st |  |  |  | ○ | ○ |  | △ | 5.233 |
| 2nd |  | ○ |  | ○ | ○ |  |  | 3.367 |
| 3rd |  |  | ○ | ○ | ○ |  |  | 2.298 |
| 4th |  | ○ | ○ | ○ |  |  |  | 1.705 |
| 5th | ○ |  | ○ | ○ |  |  |  | 1.363 |
| 6th | ○ | ○ | ○ |  |  |  |  | 1.000 |
| 7th | ○ |  | ○ |  | ○ |  |  | 0.786 |
| 8th | ○ | ○ |  |  | ○ |  |  | 0.657 |
| 9th | ○ |  |  |  | ○ | ○ |  | 0.584 |
| 10th | ○ | ○ |  |  |  | ○ |  | 0.520 |
| N |  |  |  |  |  |  |  |  |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

US 9,488,269 B2

HYDRAULIC CONTROL DEVICE FOR AUTOMATIC TRANSMISSION

CROSS-REFERENCE TO RELATED APPLICATIONS

The present application claims priority under 35 U.S.C. §119 to Japanese Patent Application No. 2014-028910, filed Feb. 18, 2014, entitled "Hydraulic Control Device." The contents of this application are incorporated herein by reference in their entirety.

BACKGROUND

1. Field

The present disclosure relates to a hydraulic control device for an automatic transmission.

2. Description of the Related Art

In general, an automatic transmission includes an engagement mechanism such as a planetary gear mechanism, a clutch, and a brake, and achieves each of shift stages by switching between power transmission paths with the engagement mechanisms. In order to reliably perform switching between shift stages, the operation of the engagement mechanism is confirmed in some cases. After the operation is confirmed, the subsequent control is performed, whereas when the operation cannot be confirmed, it is determined that abnormality such as a fault has occurred and the abnormality is dealt with. It is typical that the operation confirmation is made by using a sensor specific to the engagement mechanism. It has been proposed that in a hydraulic control device that achieves engagement by hydraulic pressure, the hydraulic pressure supplied to an engagement mechanism be monitored by a hydraulic pressure sensor or the like to perform the operation confirmation (for example, Japanese Patent No. 5123130).

In Japanese Patent No. 5123130, in the case where "source pressure cut-off valve", which is provided in case of on-fail of a linear solenoid valve, is stuck, a state of the stuck of "the source pressure cut-off valve" is detected and a source pressure cut-off switching valve is further provided.

SUMMARY

According to one aspect of the present invention, a hydraulic control device for an automatic transmission includes a plurality of engagement mechanisms, a plurality of planetary gear mechanisms, a cut-off valve, and a line pressure detection unit. The plurality of planetary gear mechanisms achieve a predetermined shift stage according to a combination of engagement and release of the engagement mechanisms. The engagement mechanisms include a mechanical engagement mechanism and a frictional engagement mechanism. The mechanical engagement mechanism fixes one of rotational elements of the planetary gear mechanisms to a casing of the automatic transmission according to a rotation direction of the rotational element. The frictional engagement mechanism achieves a shift stage in combination with the mechanical engagement mechanism. The cut-off valve has a valve element which is located at any one of a first position and a second position. The first position disables supply of a hydraulic fluid to the frictional engagement mechanism. The second position enables supply of the hydraulic fluid to the frictional engagement mechanism. The line pressure detection unit detects a line pressure. The cut-off valve switches between hydraulic fluid passages so that when the valve element is at the first position, the line pressure is supplied to the line pressure detection unit, and when the valve element is at the second position, the line pressure is not supplied to the line pressure detection unit.

According to another aspect of the present invention, a hydraulic control device for an automatic transmission includes a cut-off valve and a line pressure detector. The cut-off valve has a valve element located at one of a first position and a second position. The first position disables supply of a hydraulic fluid to a frictional engagement mechanism of the automatic transmission. The second position enables supply of the hydraulic fluid to the frictional engagement mechanism. The line pressure detector is configured to detect a line pressure. The cut-off valve is to control a hydraulic fluid passage so that the line pressure is supplied to the line pressure detector in a case where the valve element is at the first position and so that the line pressure is not supplied to the line pressure detector in a case where the valve element is at the second position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A is a table illustrating an example of an engagement table for engagement mechanisms; and FIG. 2B is a table illustrating the gear ratio of each of planetary gear mechanisms.

DESCRIPTION OF THE EMBODIMENTS

Figure 1:
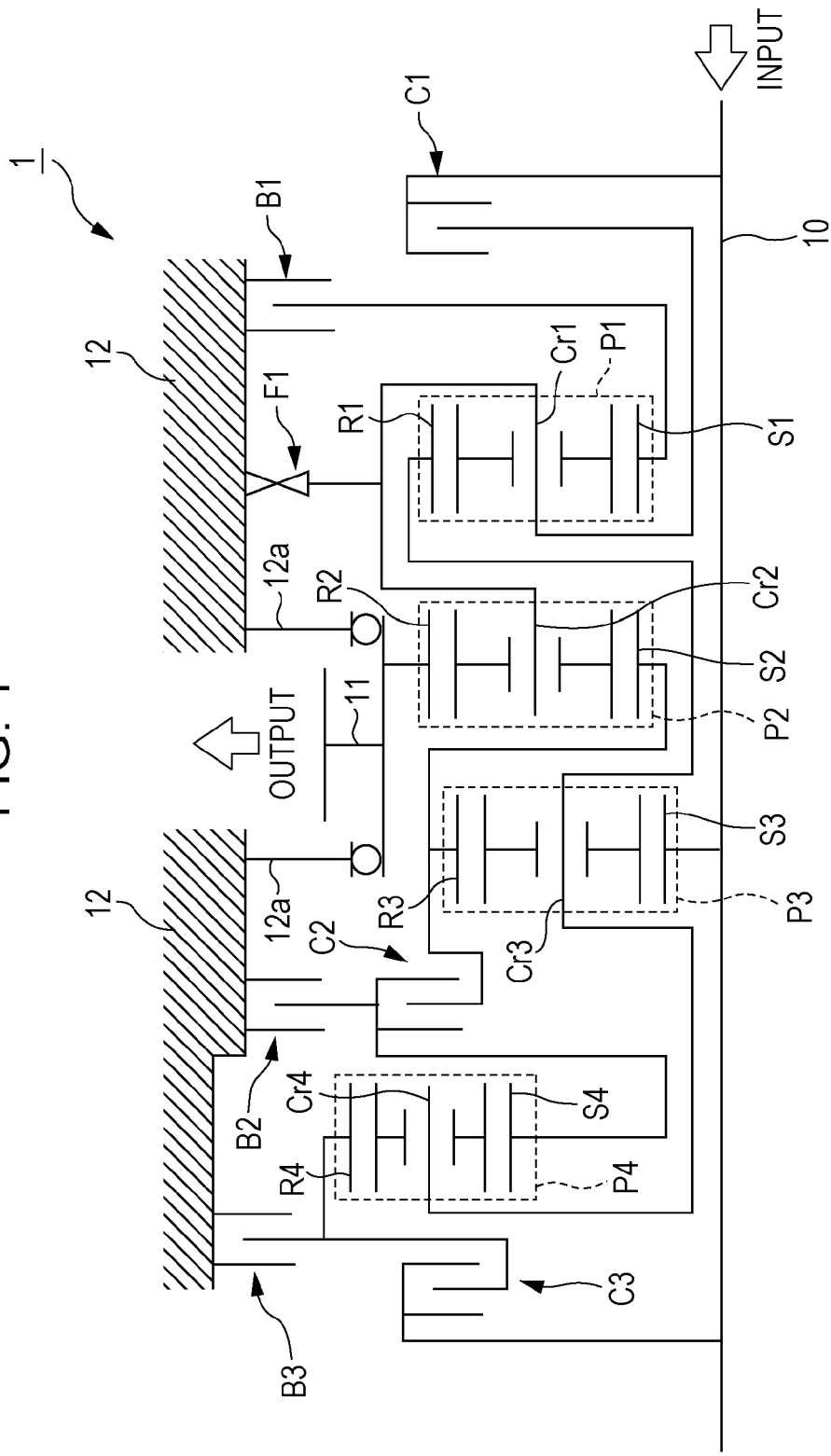
FIG. 1 is skeleton diagram of an automatic transmission according to an embodiment of the present disclosure.

The embodiments will now be described with reference to the accompanying drawings, wherein like reference numerals designate corresponding or identical elements throughout the various drawings.

FIG. 1 is skeleton diagram of an automatic transmission 1 according to an embodiment of the present disclosure. Referring to FIG. 1, an automatic transmission TL includes an input shaft 10 and an output member 11, the input shaft 10 being rotatably pivotally supported in a casing 12 serving as a transmission case for the automatic transmission TL, the output member 11 being rotatably supported coaxially with the input shaft 10 by a support member 12a supported by the casing 12.

The input shaft 10 receives an input of force from a driving source (not illustrated) such as an internal-combustion engine or an electric motor then rotates by the force. It is possible to provide a starting device between the input shaft 10 and the driving source. Providing a starting device may reduce transmission shock. The starting device may be a clutch-type starting device (such as a single plate type or multi-plate type clutch) or a fluid coupling type starting device (such as a torque converter).

The output member 11 includes an output gear concentric with the input shaft 10. Rotation of the input shaft 10 is changed in speed by the below-described transmission mechanism and transmitted to the output member 11. The rotation of the output member 11 is transmitted to a driving wheel via for example a counter shaft and a differential gear device which are not illustrated.

As transmission mechanisms, the automatic transmission 1 includes planetary gear mechanisms P1 to P4, and engagement mechanisms C1 to C3, B1 to B3, and F1. In the case of the present embodiment, the planetary gear mechanisms P1 to P4 are each a single pinion type planetary gear mechanism.

There are provided 12 rotational elements in total.

The planetary gear mechanisms P1 to P4 include sun gears S1 to S4, ring gears R1 to R4, and carriers Cr1 to Cr4 that support pinion gears, as rotational elements, and are provided coaxially with the input shaft 10.

When the rotational elements are ordered by the arrangement according to a space interval corresponding to each gear ratio in the below-described velocity nomogram of FIG. 3, the sun gear S1, the carrier Cr1, and the ring gear R1 of the planetary gear mechanism P1 may be denoted as a 1st rotational element, a 2nd rotational element, and a 3rd rotational element, respectively in this order. Similarly, the ring gear R2, the carrier Cr2, and the sun gear S2 of the planetary gear mechanism P2 may be denoted as a 4th rotational element, a 5th rotational element, and a 6th rotational element, respectively in this order. Similarly, the sun gear S3, the carrier Cr3, and the ring gear R3 of the planetary gear mechanism P3 may be denoted as a 7th rotational element, an 8th rotational element, and a 9th rotational element, respectively in this order. Similarly, the ring gear R4, the carrier Cr4, and the sun gear S4 of the planetary gear mechanism P4 may be denoted as a 10th rotational element, an 11th rotational element, and a 12th rotational element, respectively in this order.

The engagement mechanisms C1 to C3, B1 to B3, and F1 releasably connect between predetermined rotational elements of the planetary gear mechanisms P1 to P4, between the input shaft 10 and predetermined rotational elements, or between predetermined rotational elements and the casing 12. In the case of the present embodiment, the engagement mechanisms C1 to C3 are clutches, and the engagement mechanisms B1 to B3, and F1 are brakes. A power transmission path from the input shaft 10 to the output member 11 is changed by switching between engaged state (connected state) and released state (disconnected state) of each of the engagement mechanisms C1 to C3, and B1 to B3 or by switching between the states of the engagement mechanism F1, and thus a plurality of shift stages is achieved.

In the case of the present embodiment, each of the engagement mechanisms C1 to C3, and B1 to B3 is assumed to be a hydraulic frictional engagement mechanism. The hydraulic frictional engagement mechanism includes a dry or wet single plate type clutch and a dry or wet multi-plate type clutch. An electromagnetic control valve is used for driving the hydraulic frictional engagement mechanism.

The engagement mechanism F1 is a mechanical engagement mechanism that is switchable between uni-directional rotation permitted state, rotation prohibited state, and bi-directional rotation permitted state, the uni-directional rotation permitted state for only preventing the rotation of predetermined rotational elements (the carriers Cr1, Cr2 herein) in one way, the rotation prohibited state for preventing the rotation of the predetermined rotational elements in both ways, the bi-directional rotation permitted state for permitting the rotation of the predetermined rotational elements in both ways. As the engagement mechanism F1, a publicly known bi-direction clutch may be used, for example. The publicly known bi-direction clutch is switchable between uni-directional rotation permitted state, rotation prohibited state, and bi-directional rotation permitted state by the control of an electromagnetism actuator, and the uni-directional rotation permitted state is further switchable between forward rotation permitted state and reverse rotation permitted state. However, in the present embodiment, the uni-directional rotation permitted state is used as a permitted state for one of the forward and reverse rotation directions. Switching between states is achieved by hydraulic control using an electromagnetic control valve.

Next, connection relationship between the components will be described with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11.

The clutch C1 connects or disconnects the input shaft 10 and the carrier Cr1 (and the carrier Cr2 connected to the carrier Cr1) of the planetary gear mechanism P1. The clutch C2 connects or disconnects the ring gear R3 of the planetary gear mechanism P3 and the sun gear S4 of the planetary gear mechanism P4. The clutch C3 connects or disconnects the input shaft 10 and the ring gear R4 of the planetary gear mechanism P4.

The brake B1 connects or disconnects the casing 12 and the sun gear S1 of the planetary gear mechanism P1. The brake B2 connects or disconnects the casing 12 and the sun gear S4 of the planetary gear mechanism P4. The brake B3 connects or disconnects the casing 12 and the ring gear R4 of the planetary gear mechanism P4.

The brake F1 connects or disconnects the casing 12 and the carrier Cr2 (and the carrier Cr1 connected to the carrier Cr2) of the planetary gear mechanism P2. In the case of disconnection, the brake F1 is in bi-directional rotation permitted state. In the case of connection, the brake F1 is in uni-directional rotation permitted state or rotation prohibited state.

Figure 3:
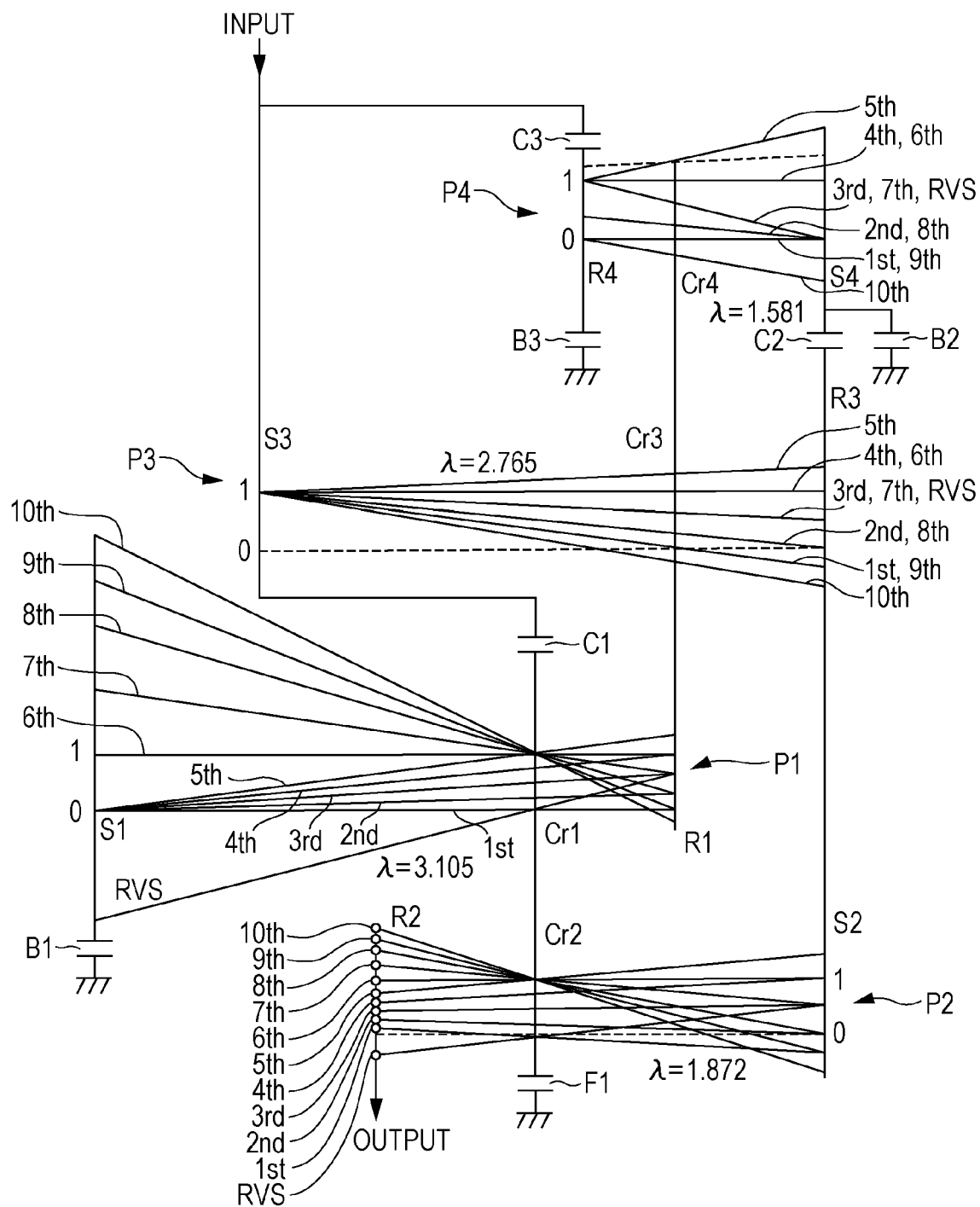
FIG. 3 is a velocity nomogram of the automatic transmission of FIG. 1.

Next, FIG. 2A is an engagement table (connection table) for the engagement mechanisms included in the automatic transmission 1, FIG. 2B illustrates the gear ratios of the planetary gear mechanisms included in the automatic transmission 1, and FIG. 3 is the velocity nomogram of the automatic transmission 1.

In the example of the engagement table of FIG. 2A, "○" indicates engaged state (state in which corresponding components are connected) and no mark indicates released state. For the brake F1, "○" indicates rotation prohibited state, "Δ" indicates uni-directional rotation permitted state, and no mark indicates bi-directional rotation permitted state. The rotation prohibited state and the uni-directional rotation permitted state are each referred to as engaged state. "GEAR RATIO" indicates possible gear ratios between the input shaft 10 and the output member 11.

In the automatic transmission 1, forward 10th gear stage and reverse 1st gear stage (RVS) are each achieved by setting three of the engagement mechanisms C1 to C3, B1 to B3, and F1 in engaged state in each shift stage. In the case of the present embodiment, the brake B1 is a frictional engagement mechanism that achieves a shift stage (here 1st gear stage) in combination with the brake F1 (and the brake B2).

The velocity nomogram of FIG. 3 illustrates the ratio of a rotational speed of each element with respect to input to the input shaft 10 in each shift stage. The vertical axis indicates speed ratio, "1" indicates a rotational speed same as the rotational speed of the input shaft 10, and "0" indicates stopped state. The horizontal axis is based on the gear ratios between the rotational elements of the planetary gear mechanisms P1 to P4. X indicates the gear ratio between the carrier Cr and the sun gear S.

<Control Device>

Figure 4:
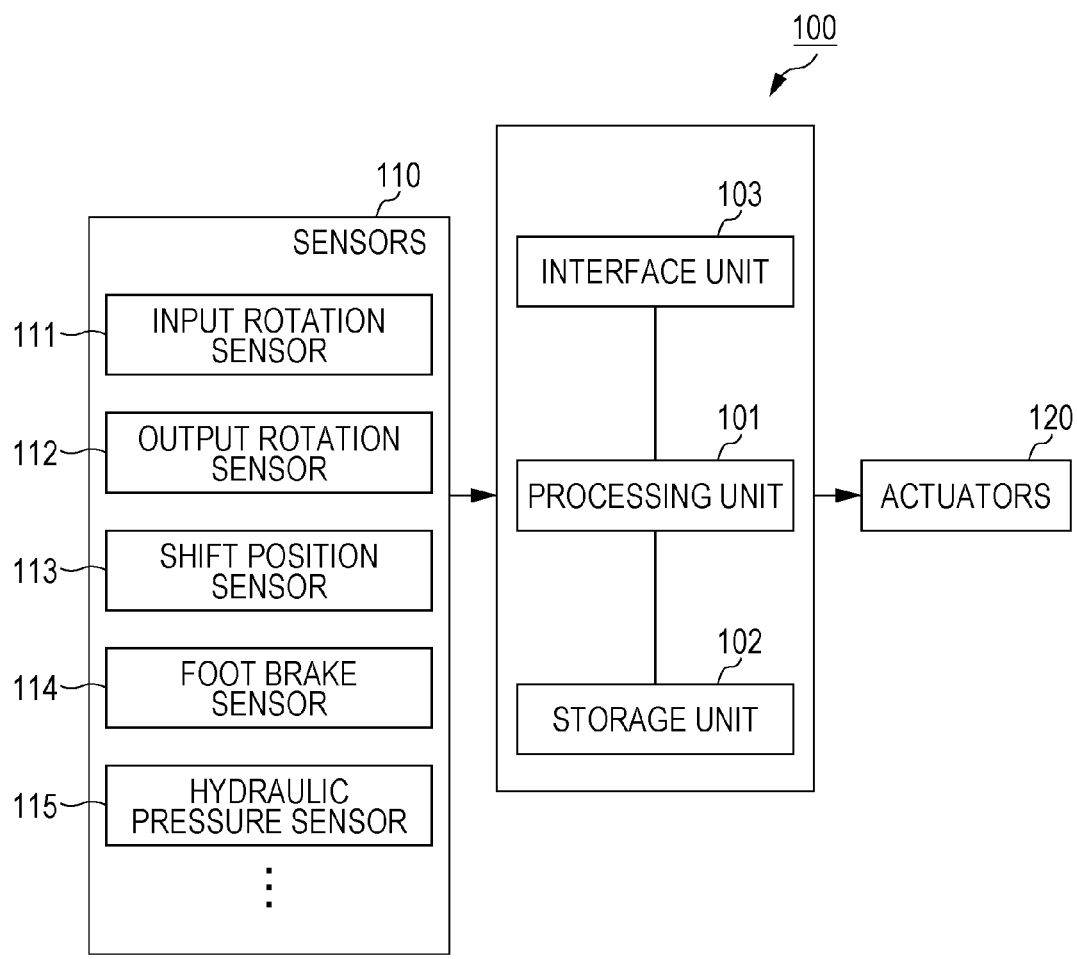
FIG. 4 is a block diagram illustrating an example of a control device for the automatic transmission of FIG. 1.

FIG. 4 is a block diagram of a control device 100 for the automatic transmission 1. The control device 100 includes a processing unit 101 such as a CPU, a storage unit 102 such as a RAM or a ROM, and an interface unit 103 that interfaces the processing unit 101 with an external device.

The processing unit 101 executes programs stored in the storage unit 102, and controls various actuators 120 based on the results of detection by various sensors 110. The various actuators 120 include the below-described control valves.

The various sensors 110 include the various sensors provided in the automatic transmission 1 and its driving source. In the relationship with the below-described example of control, the various sensors 110 include, for example, an input rotation sensor 111, an output rotation sensor 112, a shift position sensor 113, a foot brake sensor 114, and a hydraulic pressure sensor 115. The input rotation sensor 111 is a sensor that detects rotation of the input shaft 10. The output rotation sensor 112 is a sensor that detects rotation of the output member 11, and so the target of the detection may be the output member 11 itself, but may be other part such as a counter shaft to which rotation of the output member 11 is transmitted. The shift position sensor 113 detects a shift range selected by a driver. The foot brake sensor 114 detects whether or not the driver has operated the brake pedal. The hydraulic pressure sensor 115 includes the below-described hydraulic pressure sensor PS-D and hydraulic pressure switch OIL-PR.

<Hydraulic System>

Figure 5:
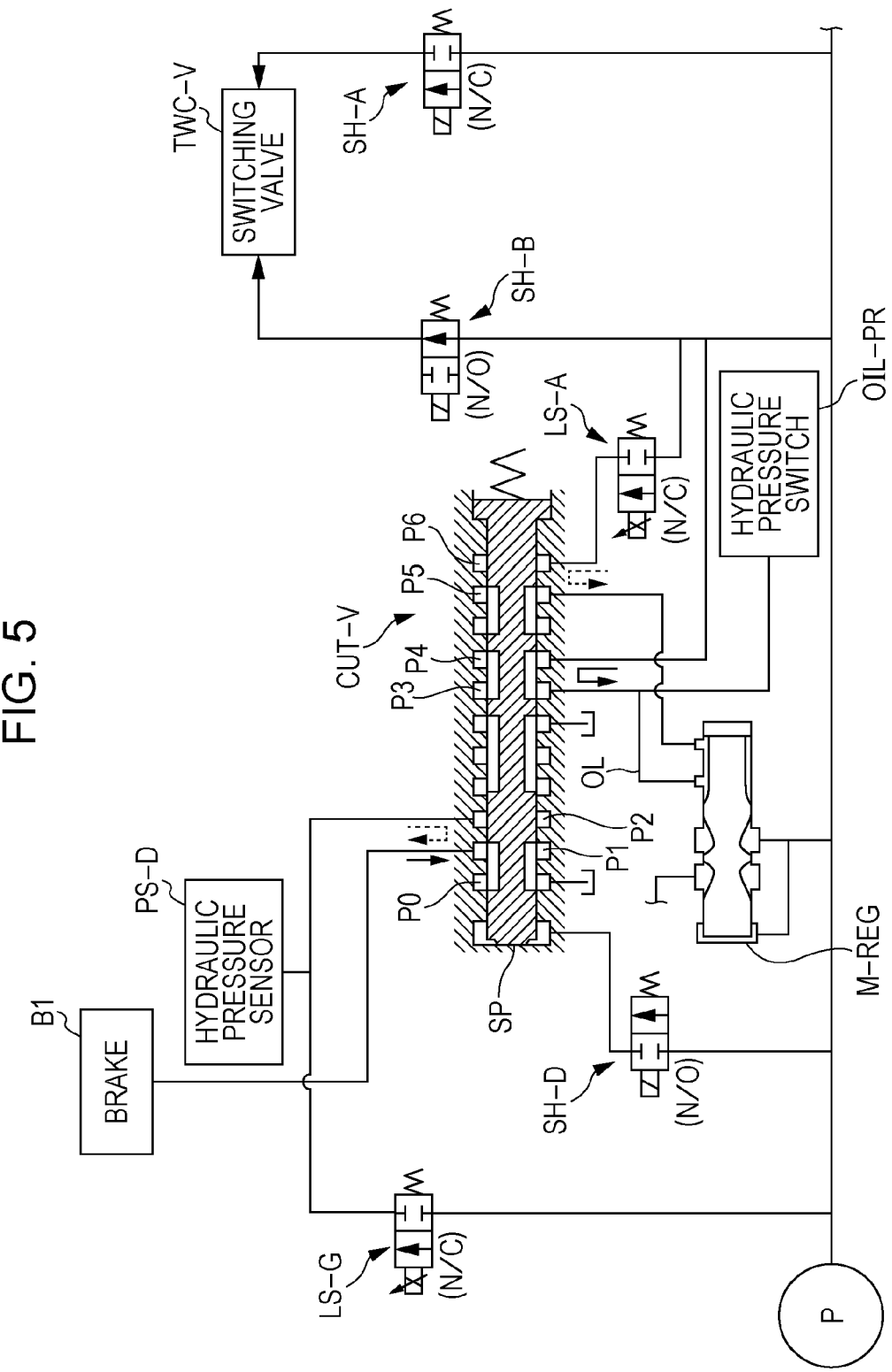
FIG. 5 is a circuit diagram of a hydraulic system related to part of the engagement mechanisms.

FIG. 5 illustrates part of a hydraulic system of the automatic transmission 1, that is, particularly a diagram illustrating the configuration of a hydraulic circuit in the vicinity (vicinity of cut-off valve CUT-V) of the source pressure cut-off mechanism that cuts off hydraulic fluid to the brake B1 for the purpose of fail-safe.

A pump P is a pump that supplies a hydraulic fluid (in pulsating flow state), and a pressure regulating valve M-REG regulates the line pressure by removing pulsating flow components in the line pressure. A control valve LS-A is a line pressure control valve that supplies a control hydraulic pressure to the pressure regulating valve M-REG according to an operational state, the control hydraulic pressure for changing the line pressure. The control valve LS-A is a normally closed type electromagnetic valve with controllable flow rate. The control hydraulic pressure is supplied to the line pressure regulating valve M-REG via the cut-off valve CUT-V. It is to be noted that a normally closed type control valve is denoted by N/C and a normally open type control valve is denoted by N/O in FIG. 5.

The cut-off valve CUT-V includes a valve element SP that switches between communication states between ports. The valve element SP may be displaced by supply, cut-off of hydraulic fluid via a control valve SH-D, and a return spring.

The control valve SH-D is a normally open type electromagnetic valve that supplies hydraulic fluid to the cut-off valve CUT-V when the valve is OFF and cuts off supply of hydraulic fluid when the valve is ON. FIG. 5 illustrates a state in which the control valve SH-D is ON, and so supply of hydraulic fluid to the cut-off valve CUT-V is cut off. At this point, the valve element SP is located at the left side position (also referred to as an "actuated position") illustrated in FIG. 5 due to urging of the return spring. When the control valve SHD is turned OFF, hydraulic fluid is supplied to the cut-off valve CUT-V and the valve element SP is displaced to the right side position (also referred to as a "set position") which is not illustrated.

When the valve element SP is at the "actuated position", a port P0 and a port P1 are in communication state, and the port P1 and a port P2 are in cut-off state. Also, a port P3 and a port P4 are in communication state, and a port P5 and a port P6 are in cut-off state. In FIG. 5, each solid line arrow indicates the direction of flow of hydraulic fluid when the valve element SP is at the "actuated position".

When the valve element SP is at the "set position", the port P1 and the port P2 are in communication state, and the port P0 and the port P1 are in cut-off state. Also, the port P3 and the port P4 are in cut-off state. Furthermore, the port P5 and the port P6 are in communication state. In FIG. 5, each dashed line arrow indicates the direction of flow of hydraulic fluid when the valve element SP is at the "set position".

The port P0 is a port for discharging hydraulic fluid. The port P1 communicates with the brake B1. The port P2 communicates with the control valve LS-G and the hydraulic pressure sensor PS-D.

The control valve LS-G is an engagement control valve for the brake B1, specifically, an electromagnetic valve that supplies hydraulic fluid to the brake B1 via the cut-off valve CUT-V with controllable flow rate. The control valve LS-G supplies hydraulic fluid to the brake B1 when the valve is ON and cuts off supply of hydraulic fluid when the valve is OFF. When the control valve LS-G is ON, hydraulic fluid is supplied to the hydraulic pressure sensor SR1 and the port P2. When the control valve LS-G is ON and the valve element SP is displaced to the "set position", hydraulic fluid is supplied to the brake B1, thereby setting the brake B1 in engaged state. It is possible to determine whether or not the brake B1 is in engaged state based on a result of detection by the hydraulic pressure sensor PS-D. When the valve element SP is located at the "actuated position", even when the control valve LS-G is turned ON, hydraulic fluid is not supplied to the brake B1, and the hydraulic fluid of the brake B1 is discharged through the port P0.

That is, even when the control valve LS-G is set in ON state due to its abnormality, the cut-off valve CUT-V is able to function as a fail-safe for preventing hydraulic fluid to be supplied to the brake B1. As illustrated in FIG. 2A, the brake B1 is set in engaged state in a low gear stage. When the shift range is a non-traveling range such as neutral range (N range) or parking range (P range), the valve element SP is located at the "actuated position". Even when the control valve LS-G is set in ON state due to its abnormality, the brake B1 will not be in engaged state, and thus it is possible to avoid such a situation that abnormal travel occurs because of a successful combination of low gear stage.

The control valve SH-A and the control valve SH-B are each an electromagnetic valve that drives a switching valve TWC-V for switching the state of the brake F1.

Next, the relationship between the position of the valve element SP and the pressure regulating valve M-REG, the hydraulic pressure switch OIL-PR, the control valve LS-A will be described.

The port P3 of the cut-off valve CUT-V is connected via a hydraulic fluid passage OL to pressure regulating ports of the hydraulic pressure switch OIL-PR and the pressure regulating valve M-REG. The line pressure is inputted to the port P4. The port P5 is connected to the pressure regulating port of the pressure regulating valve M-REG via the hydraulic fluid passage, and the port P6 is connected to the control valve LS-A via the hydraulic fluid passage.

As described above, when the valve element SP is at the set position, the port P3 and the port P4 are cut off. Therefore, the line pressure is not supplied to the hydraulic pressure switch OIL-PR, and thus the line pressure is not detected. The line pressure is not supplied to the pressure regulating ports of the pressure regulating valve M-REG via the hydraulic fluid passage OL. On the other hand, the port PS and the port P6 communicate with each other. Therefore, a control hydraulic pressure is supplied from the control valve LS-A to the pressure regulating ports of the pressure regulating valve M-REG, and thus the line pressure is controlled at a hydraulic pressure according to the control hydraulic pressure.

As described above, when the valve element SP is at the actuated position, the port P5 and the port P6 are cut off. Therefore, the control hydraulic pressure from the control valve LS-A is not supplied to the pressure regulating ports of the pressure regulating valve M-REG. The port P3 and the port P4 communicate with each other. Therefore, the line pressure is supplied to the hydraulic pressure switch OIL-PR, and thus the line pressure is detected. Also, the line pressure is supplied to the pressure regulating ports of the pressure regulating valve M-REG via the hydraulic fluid passage OL, and the line pressure is maintained at a predetermined hydraulic pressure. The predetermined hydraulic pressure here is, for example, a maximum hydraulic pressure which is controllable by the control valve LS-A or a maximum hydraulic pressure of the system, and it is preferable that the predetermined hydraulic pressure be increased to a level higher than the hydraulic pressure when the valve element SP is at the set position.

With the above configuration, in the case where the valve element SP is not displaced to the actuated position after an attempt of controlling the valve element SP to be displaced to the actuated position from the set position, the line pressure is not detected by the hydraulic pressure switch OIL-PR. Therefore, it may be determined that a failure of the cut-off valve CUT-V has occurred due to sticking of the valve element SP. The hydraulic pressure switch OIL-PR may be used for detection of the line pressure and confirmation of the operation of the cut-off valve CUT-V, and thus it is possible to confirm the operation of the source pressure cut-off mechanism while reducing additional cost.

In the case where the valve element SP is stuck at the actuated position, the line pressure is supplied to the pressure regulating ports of the pressure regulating valve M-REG via the hydraulic fluid passage OL, and thus the line pressure is maintained at a predetermined hydraulic pressure. As a result, indispensable operations are able to be performed, for example, an operation of the switching valve TWC-V for switching the state of the brake F1 may be performed.

EXAMPLE OF CONTROL

Figure 6:
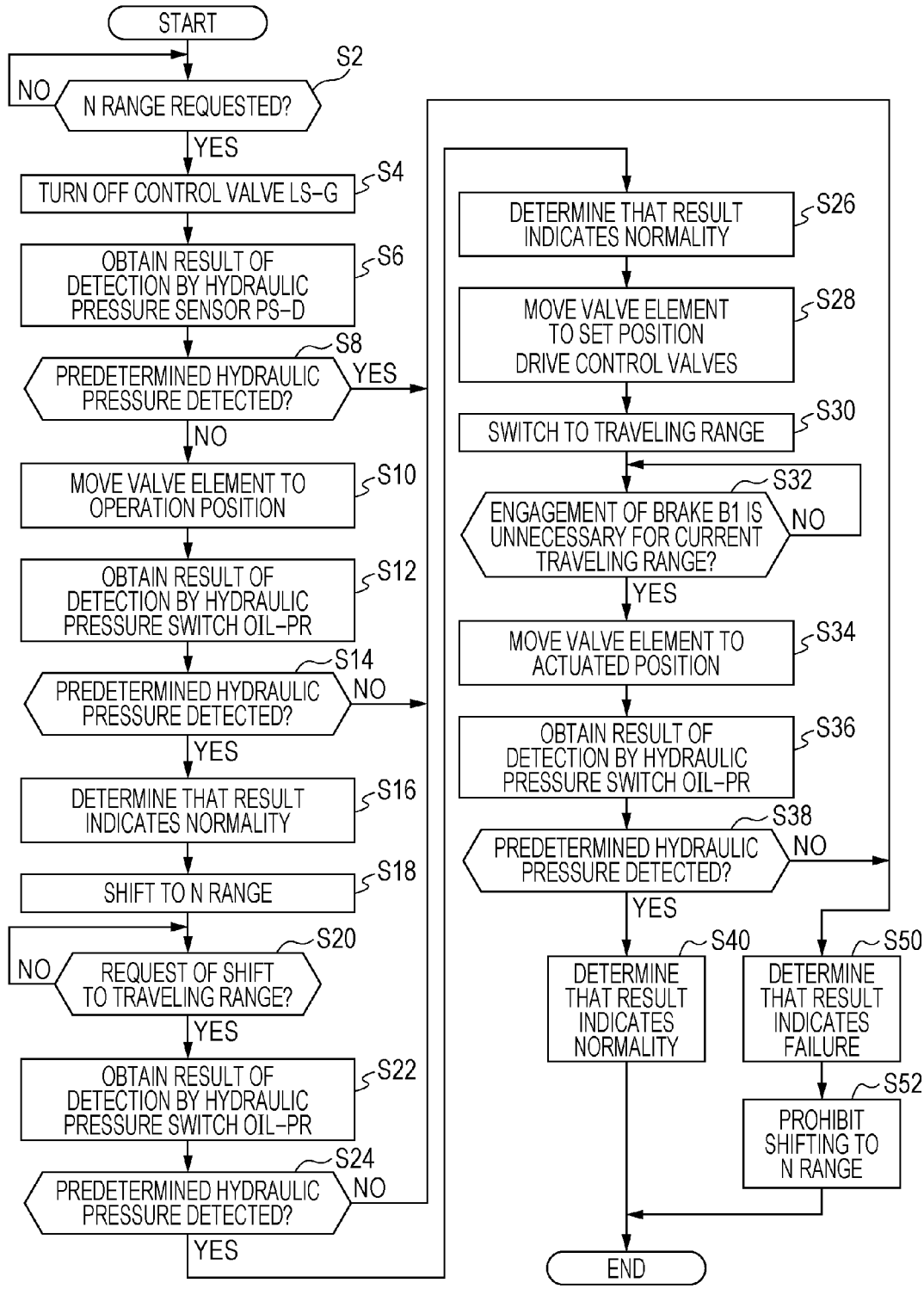
FIG. 6 is a flow chart illustrating an example of processing performed by the control device of FIG. 4.

FIG. 6 is a flow chart illustrating an example of processing performed by the control device 100. This processing example represents an example related to the case where shift request to N range is made, then shift request to the travelling range is made. As a precondition, it is assumed that the valve element SP is at the set position and the brake B1 is in engaged state.

In S2, it is determined whether or not N range is requested. When the determination is affirmatively made, the processing flow proceeds to S4, otherwise the processing flow proceeds to S6. In S4, the control valve LS-G is turned OFF. In normal conditions, the brake El is released accordingly. In S6, for confirmation of the operation of the hydraulic pressure sensor PS-D and the control valve LS-G, a result of detection by the hydraulic pressure sensor PS-D is obtained. In S8, it is determined based on the detection result obtained in S6 whether or not the hydraulic pressure sensor PS-D has detected a predetermined hydraulic pressure (for example, a hydraulic pressure which causes the brake El to be engaged). When a predetermined hydraulic pressure is detected, the control valve LS-G is in ON state even though the control valve LS-G is attempted to be turned OFF. Thus, the processing flow proceeds to S50 and it is determined that a failure of the hydraulic pressure sensor PS-D or the control valve LS-G has occurred. When the predetermined hydraulic pressure is not detected, the processing flow proceeds to S10.

In S10, the valve element SP is displaced to the actuated position by the control valve SH-D. In S12, for confirmation of the operation of the hydraulic pressure switch OIL-PR, the cut-off valve CUT-V, and the control valve SH-D, a result of detection by the hydraulic pressure switch OIL-PR is obtained. In S14, it is determined based on the detection result obtained in S12 whether or not the hydraulic pressure switch OIL-PR has detected a predetermined hydraulic pressure (for example, the line pressure). When a predetermined hydraulic pressure is detected, it is confirmed that the hydraulic pressure switch OIL-PR is normal and the valve element SP has been displaced to the actuated position, and thus the processing flow proceeds to S16 and it is determined that the hydraulic pressure switch OIL-PR, the cut-off valve CUT-V, and the control valve SH-D are normal. When a predetermined hydraulic pressure is not detected, it is determined that the valve element SP remains to be located at the set position or the hydraulic pressure switch OIL-PR is unable to detect a hydraulic pressure. Thus, the processing flow proceeds to S50 and it is determined that a failure of the hydraulic pressure switch OIL-PR, the cut-off valve CUT-V, or the control valve SH-D has occurred.

In S18, the control valves of the engagement mechanisms are suitably driven to cause a shift to N range. In this manner, a shift to N range and a failure determination as to the hydraulic circuit system have been made.

Next, the flow proceeds to the processing at the time of switching from N range to travelling range. In S20, it is determined whether or not the travelling range is requested. When the determination is affirmatively made, the processing flow proceeds to S22.

In S22, for confirmation of the operation of the hydraulic pressure switch OIL-PR, the cut-off valve CUT-V, and the control valve SH-D, a result of detection by the hydraulic pressure switch OIL-PR is obtained. In S24, it is determined based on the detection result obtained in S22 whether or not the hydraulic pressure switch OIL-PR has detected a predetermined hydraulic pressure (for example, the line pressure). When a predetermined hydraulic pressure is detected, it is confirmed that the hydraulic pressure switch OIL-PR is normal and the valve element SP has been maintained at the actuated position, and thus the processing flow proceeds to S26 and it is determined that the hydraulic pressure switch OIL-PR, the cut-off valve CUT-V, and the control valve SH-D are normal. When a predetermined hydraulic pressure is not detected, it is determined that a failure of the hydraulic pressure switch OIL-PR has occurred or the valve element SP has been displaced to the set position. Thus, the processing flow proceeds to S50 and it is determined that a failure of the hydraulic pressure switch OIL-PR, the cut-off valve CUT-V, or the control valve SH-D has occurred.

In S28, the control valves of the engagement mechanisms are suitably driven to achieve the requested travelling range. At this point, the valve element SP is displaced to the set position. In S30, switching to the requested travelling range is completed.

S32 to S38 deal with the processing of making a failure determination while the vehicle is running. In S32, it is determined whether or not the current travelling range is a travelling range (for example, 6th gear stage to 10th gear stage) for which engagement of the brake B1 is unnecessary. When the determination is affirmatively made, the processing flow proceeds to S34. In S34, the valve element SP is displaced to the actuated position. In S36, for confirmation of the operation of the hydraulic pressure switch OIL-PR, the cut-off valve CUT-V, and the control valve SH-D, a result of detection by the hydraulic pressure switch OIL-PR is obtained. In S38, it is determined based on the detection result obtained in S36 whether or not the hydraulic pressure switch OIL-PR has detected a predetermined hydraulic pressure (for example, the line pressure). When a predetermined hydraulic pressure is detected, it is confirmed that the hydraulic pressure switch OIL-PR is normal and the valve element SP has been maintained at the actuated position, and thus the processing flow proceeds to S40 and it is determined that the hydraulic pressure switch OIL-PR, the cut-off valve CUT-V, and the control valve SH-D are normal. When a predetermined hydraulic pressure is not detected, it, is determined that a failure of the hydraulic pressure switch OIL-PR has occurred or the valve element SP has been displaced to the set position. Thus, the processing flow proceeds to S50 and it is determined that a failure of the hydraulic pressure switch OIL-PR, the cut-off valve CUT-V, or the control valve SH-D has occurred.

In the case where determination of a failure is made in S50, the processing flow proceeds to S52 and shift to N range is prohibited. Even when N range is requested, other range is maintained or change to other range is made, and a driver is informed of a failure.

So far, the processing for one unit has been completed. Although the processing related to N range has been illustrated herein, the present disclosure is applicable to other non-traveling range such as P range.

According to the present disclosure, a hydraulic control device for an automatic transmission is provided, the hydraulic control device including: a plurality of engagement mechanisms; and a plurality of planetary gear mechanisms that achieves a predetermined shift stage according to a combination of engagement and release of the engagement mechanisms, the engagement mechanisms including a mechanical engagement mechanism that fixes one of rotational elements of the planetary gear mechanisms to a casing of the automatic transmission according to a rotation direction of the rotational element, and a frictional engagement mechanism that achieves a shift stage in combination with the mechanical engagement mechanism, a cut-off valve having a valve element which is located at any one of a first position and a second position, the first position disabling supply of a hydraulic fluid to the frictional engagement mechanism, the second position enabling supply of the hydraulic fluid to the frictional engagement mechanism; and a line pressure detection unit that detects a line pressure. The cut-off valve switches between hydraulic fluid passages so that when the valve element is at the first position, the line pressure is supplied to the line pressure detection unit, and when the valve element is at the second position, the line pressure is not supplied to the line pressure detection unit.

With this configuration, the line pressure detection unit may be used for detection of the line pressure and confirmation of the operation of the cut-off valve. Therefore, it is possible to confirm the operation of the source pressure cut-off mechanism while reducing additional cost.

In the present disclosure, the hydraulic control device may further include: a pressure regulating valve that regulates a line pressure; a line pressure control valve that supplies a control hydraulic pressure for changing the line pressure to the pressure regulating valve via the cut-off valve; and a line pressure supply hydraulic fluid passage that supplies the line pressure to the pressure regulating valve via the cut-off valve to maintain the line pressure at a predetermined hydraulic pressure, and the cut-off valve may switch between hydraulic fluid passages so that when the valve element is at the second position, the control hydraulic pressure is supplied to the pressure regulating valve and the line pressure is not supplied to the pressure regulating valve through the line pressure supply hydraulic fluid passage, and when the valve element is at the first position, the control hydraulic pressure is not supplied to the pressure regulating valve and the line pressure is supplied to the pressure regulating valve through the line pressure supply hydraulic fluid passage.

With this configuration, even in the case where control of the line pressure by the line pressure control valve becomes difficult during the control by the line pressure control valve, the line pressure may be maintained at a predetermined hydraulic pressure.

In the present disclosure, the automatic transmission may include a predetermined range which is a non-traveling range, and when the predetermined range is selected, the valve element may be set at the first position, and subsequently, when the line pressure is not detected by the line pressure detection unit, it may be determined that a failure of the cut-off valve has occurred.

With this configuration, a failure of the cut-off valve which is stuck at the first position is detectable by the line pressure detection unit.

In the present disclosure, the hydraulic control device may further include an engagement control valve that switches between supply and cut-off of a hydraulic fluid to the frictional engagement mechanism; and a hydraulic fluid pressure detection unit that detects a hydraulic pressure of the hydraulic fluid to the frictional engagement mechanism, and a hydraulic fluid passage may be set through which the hydraulic fluid is supplied to the frictional engagement mechanism via the cut-off valve by the engagement control valve, and when the engagement control valve is in a state which enables supply of the hydraulic fluid and the valve element is at the second position, the hydraulic fluid may be supplied to the frictional engagement mechanism, and when the engagement control valve is in a state which disables supply of the hydraulic fluid and in the case where the hydraulic pressure detection unit detects the hydraulic pressure of the hydraulic fluid, it may be determined that a failure of the engagement control valve has occurred.

With this configuration, a failure of the engagement control valve is detectable.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic control device for an automatic transmission, comprising:
   a plurality of engagement mechanisms;
   a plurality of planetary gear mechanisms that achieve a predetermined shift stage according to a combination of engagement and release of the engagement mechanisms, the engagement mechanisms including
      a mechanical clutch or brake that fixes one of rotational elements of the planetary gear mechanisms to a casing of the automatic transmission according to a rotation direction of the rotational element, and
      a frictional clutch or brake that achieves a shift stage in combination with the mechanical clutch or brake;
   a cut-off valve having a valve element which is located at any one of a first position and a second position, the first position disabling supply of a hydraulic fluid to the frictional clutch or brake, the second position enabling supply of the hydraulic fluid to the frictional clutch or brake; and
   a line pressure detector that detects a line pressure,
   wherein the cut-off valve switches between hydraulic fluid passages so that when the valve element is at the first position, the line pressure is supplied to the line pressure detector, and when the valve element is at the second position, the line pressure is not supplied to the line pressure detector, and
   wherein the hydraulic control device determines a failure of the cut-off valve has occurred in a case where the line pressure detector does not detect the line pressure after the valve element is positioned at the first position.

2. A hydraulic control device for an automatic transmission, comprising:
   a plurality of engagement mechanisms;
   a plurality of planetary gear mechanisms that achieve a predetermined shift stage according to a combination of engagement and release of the engagement mechanisms, the engagement mechanisms including
      a mechanical clutch or brake that fixes one of rotational elements of the planetary gear mechanisms to a casing of the automatic transmission according to a rotation direction of the rotational element, and
      a frictional clutch or brake that achieves a shift stage in combination with the mechanical clutch or brake;
   a cut-off valve having a valve element which is located at any one of a first position and a second position, the first position disabling supply of a hydraulic fluid to the frictional clutch or brake, the second position enabling supply of the hydraulic fluid to the frictional clutch or brake; and
   a line pressure detector that detects a line pressure;
   a pressure regulating valve that regulates a line pressure;
   a line pressure control valve that supplies a control hydraulic pressure for changing the line pressure to the pressure regulating valve via the cut-off valve; and
   a line pressure supply hydraulic fluid passage that supplies the line pressure to the pressure regulating valve via the cut-off valve to maintain the line pressure at a predetermined hydraulic pressure,
   wherein the cut-off valve switches between hydraulic fluid passages so that when the valve element is at the first position, the line pressure is supplied to the line pressure detector, and when the valve element is at the second position, the line pressure is not supplied to the line pressure detector, and
   wherein the cut-off valve switches between hydraulic fluid passages so that when the valve element is at the second position, the control hydraulic pressure is supplied to the pressure regulating valve and the line pressure is not supplied to the pressure regulating valve through the line pressure supply hydraulic fluid passage, and when the valve element is at the first position, the control hydraulic pressure is not supplied to the pressure regulating valve and the line pressure is supplied to the pressure regulating valve through the line pressure supply hydraulic fluid passage.

3. A hydraulic control device for an automatic transmission, comprising:
   a plurality of engagement mechanisms;
   a plurality of planetary gear mechanisms that achieve a predetermined shift stage according to a combination of engagement and release of the engagement mechanisms, the engagement mechanisms including
      a mechanical clutch or brake that fixes one of rotational elements of the planetary gear mechanisms to a casing of the automatic transmission according to a rotation direction of the rotational element, and
      a frictional clutch or brake that achieves a shift stage in combination with the mechanical clutch or brake;
   a cut-off valve having a valve element which is located at any one of a first position and a second position, the first position disabling supply of a hydraulic fluid to the frictional clutch or brake, the second position enabling supply of the hydraulic fluid to the frictional clutch or brake; and
   a line pressure detector that detects a line pressure,
   wherein the cut-off valve switches between hydraulic fluid passages so that when the valve element is at the first position, the line pressure is supplied to the line pressure detector, and when the valve element is at the second position, the line pressure is not supplied to the line pressure detector,
   wherein the automatic transmission includes a predetermined range which is a non-traveling range, and
   when the predetermined range is selected, the valve element is set at the first position, and subsequently, when the line pressure is not detected by the line pressure detector, it is determined that a failure of the cut-off valve has occurred.

4. The hydraulic control device according to claim 1, further comprising:
   an engagement control valve that switches between supply and cut-off of a hydraulic fluid to the frictional clutch or brake; and
   a hydraulic fluid pressure sensor that detects a hydraulic pressure of the hydraulic fluid to the frictional clutch or brake,
   wherein a hydraulic fluid passage is set through which the hydraulic fluid is supplied to the frictional clutch or brake via the cut-off valve by the engagement control valve, and when the engagement control valve is in a state which enables supply of the hydraulic fluid and the valve element is at the second position, the hydraulic fluid is supplied to the frictional clutch or brake, and when the engagement control valve is in a state which disables supply of the hydraulic fluid and in the case where the hydraulic pressure sensor detects the hydraulic pressure of the hydraulic fluid, it is determined that failure of the engagement control valve has occurred.

5. The hydraulic control device according to claim 2, further comprising:
an engagement control valve that switches between supply and cut-off of a hydraulic fluid to the frictional clutch or brake; and
a hydraulic fluid pressure sensor that detects a hydraulic pressure of the hydraulic fluid to the frictional clutch or brake,
wherein a hydraulic fluid passage is set through which the hydraulic fluid is supplied to the frictional clutch or brake via the cut-off valve by the engagement control valve, and when the engagement control valve is in a state which enables supply of the hydraulic fluid and the valve element is at the second position, the hydraulic fluid is supplied to the frictional clutch or brake, and
when the engagement control valve is in a state which disables supply of the hydraulic fluid and in the case where the hydraulic pressure sensor detects the hydraulic pressure of the hydraulic fluid, it is determined that a failure of the engagement control valve has occurred.

6. The hydraulic control device according to claim 3, further comprising:
an engagement control valve that switches between supply and cut-off of a hydraulic fluid to the frictional clutch or brake; and
a hydraulic fluid pressure sensor that detects a hydraulic pressure of the hydraulic fluid to the frictional clutch or brake,
wherein a hydraulic fluid passage is set through which the hydraulic fluid is supplied to the frictional clutch or brake via the cut-off valve by the engagement control valve, and when the engagement control valve is in a state which enables supply of the hydraulic fluid and the valve element is at the second position, the hydraulic fluid is supplied to the frictional clutch or brake, and
when the engagement control valve is in a state which disables supply of the hydraulic fluid and in the case where the hydraulic pressure sensor detects the hydraulic pressure of the hydraulic fluid, it is determined that failure of the engagement control valve has occurred.

7. A hydraulic control device for an automatic transmission, comprising:
a cut-off valve having a valve element located at one of a first position and a second position, the first position disabling supply of a hydraulic fluid to a frictional clutch or brake of the automatic transmission, the second position enabling supply of the hydraulic fluid to the frictional clutch or brake; and
a line pressure detector configured to detect a line pressure, the cut-off valve being to control a hydraulic fluid passage so that the line pressure is supplied to the line pressure detector in a case where the valve element is at the first position and so that the line pressure is not supplied to the line pressure detector in a case where the valve element is at the second position,
wherein the hydraulic control device determines a failure of the cut-off valve has occurred in a case where the line pressure detector does not detect the line pressure after the valve element is positioned at the first position.

8. The hydraulic control device according to claim 7, further comprising:
a pressure regulating valve to regulate the line pressure;
a line pressure control valve to supply a control hydraulic pressure for changing the line pressure to the pressure regulating valve via the cut-off valve; and
a line pressure supply hydraulic fluid passage to supply the line pressure to the pressure regulating valve via the cut-off valve to maintain the line pressure at a predetermined hydraulic pressure, the cut-off valve being to control the hydraulic fluid passage so that the control hydraulic pressure is supplied to the pressure regulating valve and the line pressure is not supplied to the pressure regulating valve through the line pressure supply hydraulic fluid passage in a case where the valve element is at the second position and so that the control hydraulic pressure is not supplied to the pressure regulating valve and the line pressure is supplied to the pressure regulating valve through the line pressure supply hydraulic fluid passage in a case where the valve element is at the first position.

9. The hydraulic control device according to claim 7, wherein the automatic transmission includes a predetermined range which is a non-traveling range, and
wherein the valve element is set at the first position in a case where the predetermined range is selected and subsequently, it is determined that failure of the cut-off valve has occurred in a case where the line pressure detector does not detect the line pressure.

10. The hydraulic control device according to claim 7, further comprising:
an engagement control valve to switch between supply and cut-off of the hydraulic fluid to the frictional clutch or brake; and
a hydraulic fluid pressure detector configured to detect a hydraulic pressure of the hydraulic fluid supplied to the frictional clutch or brake,
wherein the hydraulic fluid passage is set through which the engagement control valve supplies the hydraulic fluid to the frictional clutch or brake via the cut-off valve,
wherein the hydraulic fluid is supplied to the frictional clutch or brake in a case where the engagement control valve enables supply of the hydraulic fluid and the valve element is at the second position, and
wherein it is determined that failure of the engagement control valve has occurred in a case where the engagement control valve disables supply of the hydraulic fluid and the hydraulic pressure detector detects the hydraulic pressure of the hydraulic fluid.

11. The hydraulic control device according to claim 8, further comprising:
an engagement control valve to switch between supply and cut-off of the hydraulic fluid to the frictional clutch or brake; and
a hydraulic fluid pressure detector configured to detect a hydraulic pressure of the hydraulic fluid supplied to the frictional clutch or brake,
wherein the hydraulic fluid passage is set through which the engagement control valve supplies the hydraulic fluid to the frictional clutch or brake via the cut-off valve,
wherein the hydraulic fluid is supplied to the frictional clutch or brake in a case where the engagement control valve enables supply of the hydraulic fluid and the valve element is at the second position, and
wherein it is determined that failure of the engagement control valve has occurred in a case where the engagement control valve disables supply of the hydraulic fluid and the hydraulic pressure detector detects the hydraulic pressure of the hydraulic fluid.

12. The hydraulic control device according to claim 9, further comprising:

an engagement control valve to switch between supply and cut-off of the hydraulic fluid to the frictional clutch or brake; and a hydraulic fluid pressure detector configured to detect a hydraulic pressure of the hydraulic fluid supplied to the frictional clutch or brake, wherein the hydraulic fluid passage is set through which the engagement control valve supplies the hydraulic fluid to the frictional clutch or brake via the cut-off valve, wherein the hydraulic fluid is supplied to the frictional clutch or brake in a case where the engagement control valve enables supply of the hydraulic fluid and the valve element is at the second position, and wherein it is determined that failure of the engagement control valve has occurred in a case where the engagement control valve disables supply of the hydraulic fluid and the hydraulic pressure detector detects the hydraulic pressure of the hydraulic fluid.

\* \* \* \* \*